US008175163B2

United States Patent
Chappalli et al.

(10) Patent No.: US 8,175,163 B2
(45) Date of Patent: May 8, 2012

(54) SYSTEM AND METHOD FOR MOTION COMPENSATION USING A SET OF CANDIDATE MOTION VECTORS OBTAINED FROM DIGITAL VIDEO

(75) Inventors: Mahesh B. Chappalli, Irvine, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 428 days.

(21) Appl. No.: 12/482,295

(22) Filed: Jun. 10, 2009

(65) Prior Publication Data
US 2010/0316125 A1  Dec. 16, 2010

(51) Int. Cl.
*H04N 11/02* (2006.01)
(52) U.S. Cl. .................................. 375/240.16
(58) Field of Classification Search ........... 375/240.01, 375/240.16
See application file for complete search history.

(56) References Cited

U.S. PATENT DOCUMENTS

| | | | | |
|---|---|---|---|---|
| 5,541,660 | A * | 7/1996 | Kim et al. | 375/240.16 |
| 6,081,553 | A * | 6/2000 | Kitson et al. | 375/240 |
| 6,483,876 | B1 * | 11/2002 | Chang et al. | 375/240.16 |
| 6,704,357 | B1 * | 3/2004 | Ketcham | 375/240.01 |
| 7,224,399 | B2 * | 5/2007 | Song | 348/452 |
| 2006/0198444 | A1 * | 9/2006 | Wada | 375/240.16 |
| 2007/0110161 | A1 * | 5/2007 | Saigo et al. | 375/240.16 |
| 2009/0180543 | A1 * | 7/2009 | Tsuda et al. | 375/240.16 |
| 2009/0290029 | A1 * | 11/2009 | Li et al. | 348/208.4 |
| 2010/0321566 | A1 * | 12/2010 | Yamamoto et al. | 348/441 |

* cited by examiner

*Primary Examiner* — David Czekaj
*Assistant Examiner* — Leron Beck

(57) ABSTRACT

Embodiments include systems and methods for interpolating frames. In one embodiment, a system and method provides reduced halo and consequently a higher degree of accuracy/fidelity. In one embodiment, a method of video frame interpolation includes receiving first motion data based on a first video frame and a second video frame, receiving second motion data based on the second video frame and a third video frame, and estimating a block of an interpolated frame based on the second motion data and the first motion data. In one embodiment, the estimating comprises selectively using the second motion data based on the first motion data.

13 Claims, 9 Drawing Sheets

SYSTEM AND METHOD FOR MOTION COMPENSATION USING A SET OF CANDIDATE MOTION VECTORS OBTAINED FROM DIGITAL VIDEO

CROSS-REFERENCE TO RELATED APPLICATIONS

This application is related to U.S. patent application Ser. No. 11/748,377, filed on May 14, 2007, and U.S. patent application Ser. No. 12/195,291 filed on Aug. 20, 2008, each of which is hereby incorporated by reference in its entirety.

BACKGROUND OF THE INVENTION

1. Field of the Invention

The invention is related to video processing. More particularly, the invention is related to motion estimation and compensation algorithms involving detection of occlusion regions in video data.

2. Description of the Related Art

Multimedia processing systems, such as video encoders, may encode multimedia data using encoding methods based on international standards such as MPEG-x and H.26x standards. Such encoding methods generally are directed to compressing the multimedia data for transmission and/or storage. Compression is broadly the process of removing redundancy from the data. In addition, video display systems may transcode or transform multimedia data for various purposes such as, for example, to ensure compatibility with display standards such as NTSC, HDTV, or PAL, to increase frame rate, to reduce perceived motion blur, and to achieve smooth motion portrayal of content with a frame rate that differs from that of the display device. These transcoding methods may perform similar functions as the encoding methods for performing frame rate conversion, de-interlacing, etc.

A video signal may be described in terms of a sequence of pictures, which include frames (an entire picture), or fields (e.g., an interlaced video stream comprises fields of alternating odd or even lines of a picture). A frame may be generally used to refer to a picture, a frame or a field. Multimedia processors, such as video encoders, may encode a frame by partitioning it into blocks or "macroblocks" of, for example, 16×16 pixels. The encoder may further partition each macroblock into subblocks. Each subblock may further comprise additional subblocks. For example, subblocks of a macroblock may include 16×8 and 8×16 subblocks. Subblocks of the 8×16 subblocks may include 8×8 subblocks, and so forth. Depending on context, a block may refer to either a macroblock or a subblock, or even a single pixel.

Video sequences may be received by a receiving device in a compressed format and subsequently decompressed by a decoder in the receiving device. Video sequences may also be received in an uncompressed state. In either case, the video sequence is characterized at least by a frame rate, and a horizontal and vertical pixel resolution. Many times, a display device associated with the receiving device may require a different frame rate and/or pixel resolution and video reconstruction of one or more video frames may be performed. Reconstruction of video frames may comprise estimating a video frame between two or more already received (or received and decompressed) video frames. The reconstruction may involve techniques known as motion estimation and motion compensation. Matching portions of video frames between two or more already received (or received and decompressed) frames are identified along with a motion vector that contains the relative locations of the matching blocks in the process of motion estimation. These matching blocks and motion vectors are then used to reconstruct portions of the intermediate frame by the process of motion compensation. Frame rate conversion, de-interlacing and transcoding are examples of processes where decoder devices create new video data based on already available video data. In addition, these motion compensation techniques can use encoded data, such as motion vectors and residual error, as well as the reconstructed video data for estimating the newly created frames.

Occlusions occurring in a video sequence present a problem to any motion estimation/compensation algorithm. Occlusions include, for example, the covering of one object (background is considered as an object) by another, and the uncovering of one object due to motion of another. Typically, the motion vectors estimated in the vicinity of occlusion areas are incorrect and using these motion vectors directly for motion compensation causes visual artifacts which are usually called "halo effect." Many approaches that have been suggested for the solution of this problem suffer from one or more drawbacks including high computational complexity, poor accuracy and localization, and insensitivity to the actual desired interpolation phase between two frames. Accordingly, a need exists for improved methods and systems of interpolating video frames.

SUMMARY OF CERTAIN INVENTIVE ASPECTS

The systems and methods of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the sample features of this invention provide advantages that include more robust and efficient reformatting of video sequences in regions including occlusions so as to reduce visible halo artifacts.

One embodiment includes a method of video frame interpolation. The method includes receiving first motion data based on a first video frame and a second video frame, receiving second motion data based on the second video frame and a third video frame, and estimating a block of an interpolated frame based on the second motion data and the first motion data. The estimating comprises selectively using the second motion data based on the first motion data. The interpolated frame is between the second and third frames. The motion vector of the first motion data is associated with a portion of the first frame that corresponds to the block that is to be estimated. For example, in one such embodiment, selectively using the second motion data based on the first motion data comprises identifying the block of the interpolated frame as being in one of a covering or uncovering area based at least in part on the first motion data.

On embodiment includes a system for video frame interpolation. The system includes a memory configured to store first motion data based on a first video frame and a second video frame and second motion data based on the second video frame and a third video frame and at least one processor configured to estimate a block of an interpolated frame based on the second motion data and the first motion data. The processor is configured to selectively use the second motion data to interpolate the frame based on the first motion data.

The interpolated frame is between the second and third frames. The motion vector of the first motion data is associated with a portion of the first frame that corresponds to the block that is to be estimated.

On embodiment includes a system for video frame interpolation. The system includes means for storing first motion data based on a first video frame and a second video frame and second motion data based on the second video frame and a third video frame and means for processing the first and second data. The processing means is configured to estimate a block of an interpolated frame based on the second motion data and the first motion data. The processor is configured to selective use the second motion data to interpolate the frame based on the first motion data. The interpolated frame is between the second and third frames, and the motion vector of the first motion data is associated with a portion of the first frame that corresponds to the block that is to be estimated. For example, in one such embodiment, the processor selectively uses the second motion data based on the first motion data by identifying the block of the interpolated frame as being in one of a covering or uncovering area based at least in part on the first motion data.

On embodiment includes a computer-program product for interpolating video frames. The product includes a computer-readable medium having stored thereon codes executable by at least one processor to: receive first motion data based on a first video frame and a second video frame, receive second motion data based on the second video frame and a third video frame, and estimate a block of an interpolated frame based on the second motion data and the first motion data. The estimate of the block is based on selectively using the second motion data based on the first motion data. The interpolated frame is between the second and third frames, and the motion vector of the first motion data is associated with a portion of the first frame that corresponds to the block that is to be estimated.

DETAILED DESCRIPTION OF CERTAIN INVENTIVE EMBODIMENTS

The following detailed description is directed to certain specific sample aspects of the invention. However, the invention can be embodied in a multitude of different ways as defined and covered by the claims. In this description, reference is made to the drawings wherein like parts are designated with like numerals throughout.

Video signals may be characterized in terms of a series of pictures, frames, or fields. As used herein, "frame" is a term that may encompass either frames or fields of a progressive video signal or frames or fields of an interlaced video signal.

As used herein, covering portions of video include objects in a first frame that are covered by an object (e.g., an object in the foreground of the covering object) in a subsequent frame. Uncovering portions of video include objects that are not present in a first frame and appear (due to being uncovered by an object in the foreground or by the uncovering object itself moving from behind a foreground object) in a subsequent frame. Normal portions of video include portions that are neither covering nor uncovering.

Embodiments include systems and methods of generating interpolated frames based on a video signal. In one embodiment, motion data between frames is used to interpolate pixel values within blocks of interpolated frames. In one embodiment, a weighted average of selected motion vectors is used to interpolate pixel values within blocks. The weighting is based on motion data of a prior frame for the target block, e.g., if interpolating between frames at t and t−1, the weighting is based on motion data from the frame at t−2. In another embodiment, rather than a weighting, specific motion vectors are select from the frame at t−2. Desirably, embodiments provide reduced halo and other related artifacts in interpolated frames as a result of improved occlusion handling.

Figure 1:
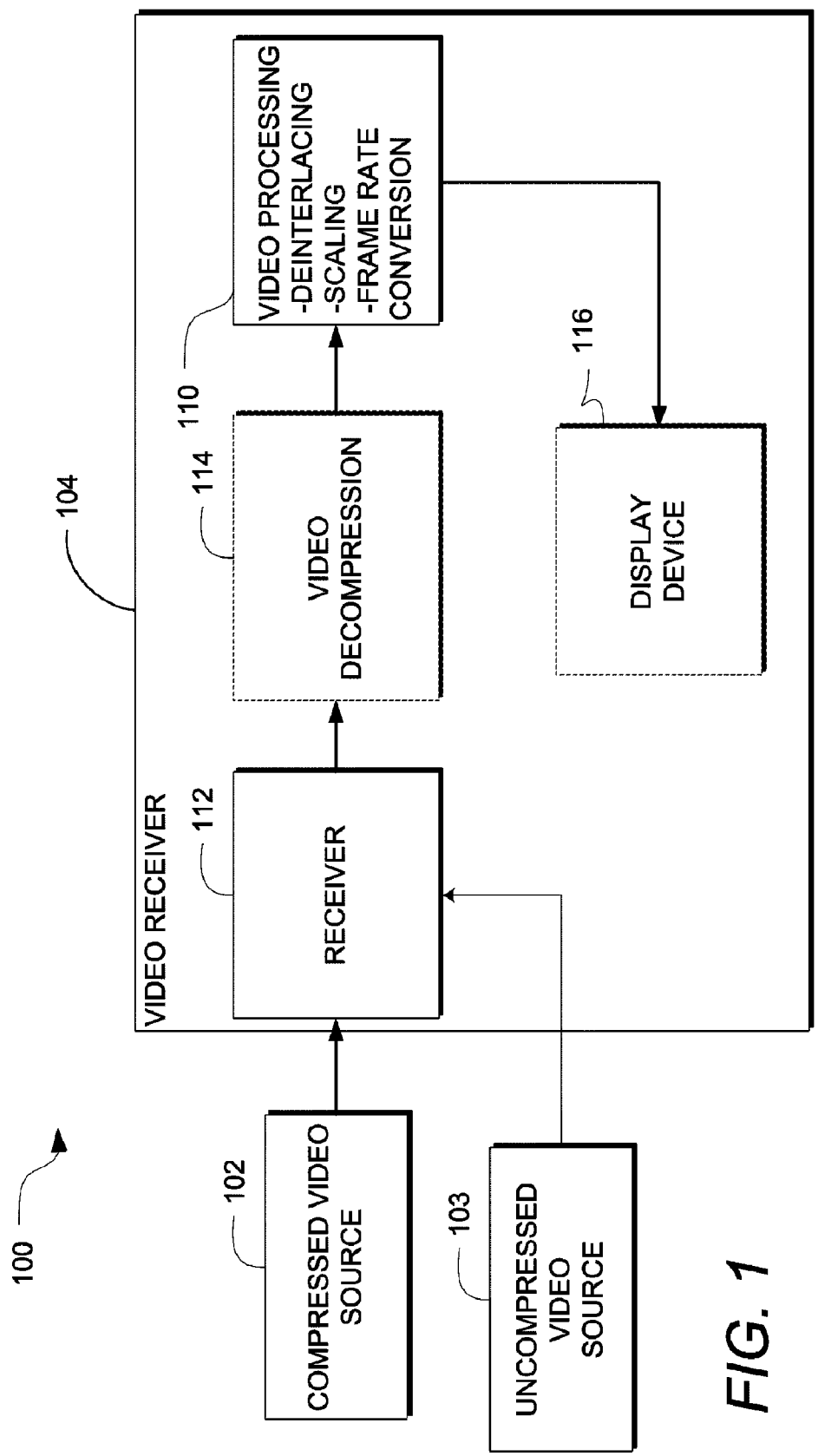
FIG. 1 is a functional block diagram of an exemplary communication system for encoding and decoding of compressed digital video data, according to one embodiment of the system and method.

FIG. 1 illustrates a functional block diagram of an exemplary communication system 100. The system 100 includes one or both of a compressed video source 102 and uncompressed video source 103 that provide motion video to a video receiver 104. The video receiver 104 includes a receiver 112, an optional video decompression module 114, a video processing module 110, and optionally includes a video display device 116.

The compressed video source 102 may provide analog or digital video from a broadcast, computer network, a DVD or other computer readable storage medium, or any other suitable source of video signals. The compressed video source 102 may be coupled to the receiver 112 via a radio frequency interface (such as ATSC broadcasts), a computer network, or a wired or wireless connection such as a component video cable, a DVI or HDMI video interface. The uncompressed video source 103 may include one or more of a video camera, or a memory device such as a disk drive coupled to the receiver 112 by any suitable video interface. The uncompressed video source 103 may provide uncompressed video in analog or digital form including in the form of luminance and chrominance, in individual color intensities such as red, green and blue, etc, or in any other suitable format.

The video decompression element 114 decodes (e.g., decompresses) received compressed video data. The video decompression element 114 reconstructs the video frames that were compressed in the encoding process. Reconstruction can include inverse transformation of transformed coefficients (e.g., discrete cosine transform (DCT), wavelet transform, etc.), reconstruction of spatially predicted data, and reconstruction of temporally predicted data. The video decompression element 114 may be implemented as part of the same device that contains the receiver 112 and processor 110, or it can be a separate device. The video receiver 104 can be part of a set-top box, a DVD player, a PC, etc. In some embodiments, the video receiver 104 may receive uncompressed video (e.g., from the uncompressed video source 103). In these embodiments, the video decompression element 114 may be omitted. The video receiver 104 may also include a display 116. Generally, a television refers to a device that integrates a broadcast receiver and a display 116, however, the term may also be applied to any display device, whether receiving broadcast transmissions via an integrated receiver or not.

The format of the reconstructed video output from the video decompression element 114 may depend on the format that was encoded by the video encoder. For example, digital video formats can include different frame rates, different numbers of lines and rows of pixels, interlaced and non-interlaced, etc. For example, movies are typically produced at 24 fps (frames per second) format, NTSC is 30 frames per second and PAL is 25 frames per second. The format may be interlaced or progressive. For example, high definition formats (such as supported by digital video broadcast standards) include The reformatting module 116 modifies the video signal to a format that fits the format of a display device 118 that is connected to the video receiver 104. The display device may be a television set that includes the display device 116, the receiver 112, the processor 110, and the video decompression module 114 (e.g., configured to receive NTSC, PAL, ATSC, DVB/T, etc.), or a computer monitor running at frame rates such as 70 Hz, 75 Hz, 80 Hz, etc.

The processor 110 may be configured to perform video processing functions such as deinterlacing, scaling, and frame rate conversion. In particular, video signals may be received at a first frame rate, e.g., 24 fps (e.g., filmed video) or 50/60 fps (broadcast video) for display on a video display 116 that has a different native or preferred display rate, e.g., 100, 120, 200, or 240 Hz. In such a configuration, the received frames can merely be duplicated an appropriate number of times to display at the rate of the display device. However, in one embodiment, the processor 110 is configured to interpolate added frames to improve the perceived temporal resolution of the video signal. Desirably, such interpolation minimizes artifacts such as halo effects that can occur, for example, due to moving objects (or areas) in a video scene passing over, or occluding, one another.

Figure 2:
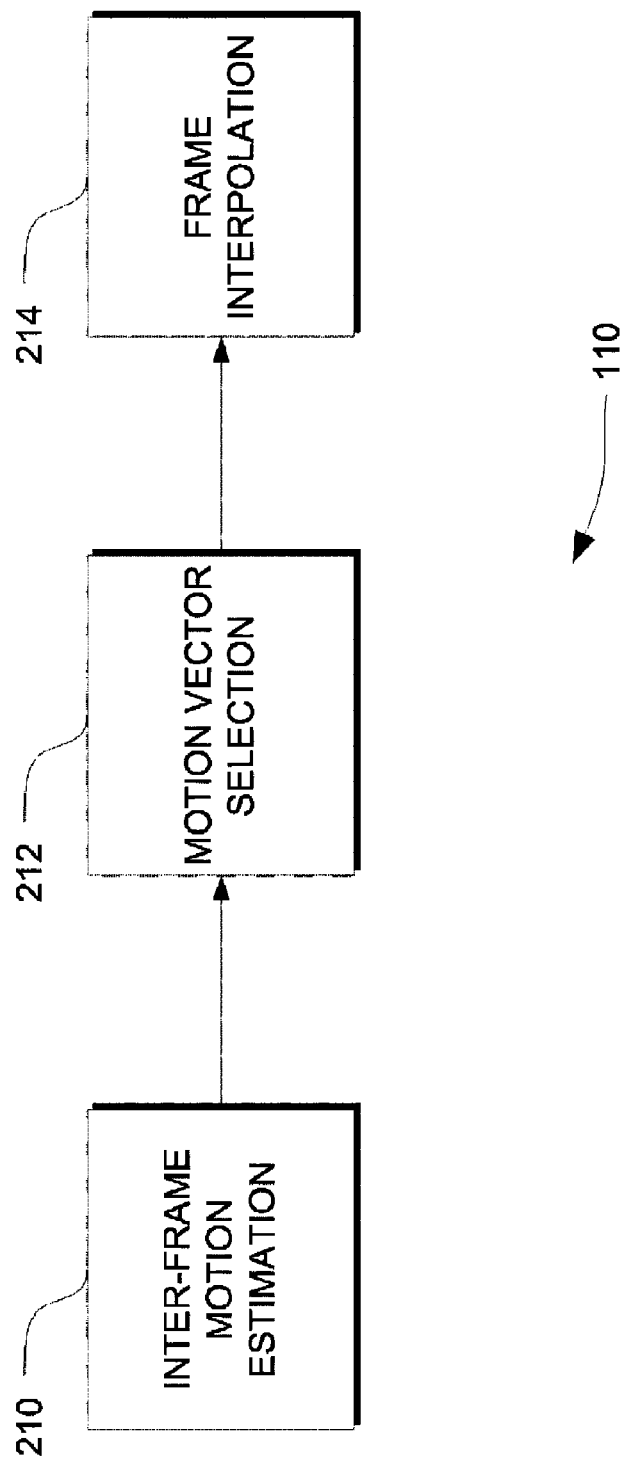
FIG. 2 is a block diagram illustrating an embodiment of a video reception system that may be used for the video reception device in a communication system such as illustrated in FIG. 1.

FIG. 2 is a block diagram illustrating one embodiment of the processor 110 of the video processor 104 in more detail. In the illustrated embodiment, the processor 110 comprises a motion estimation module 210, a motion vector selection module 212, and a frame interpolation module 214. The motion estimation module 210 identifies portions of video that exhibit temporal redundancy from between two or more frames of video sequences as discussed above. The identified portions of video data containing temporal redundancy can be used to interpolate new frames of video, such as done in frame rate conversion or de-interlacing. The portions of reference frames identified by the motion estimation module 210 may be used by the frame interpolation module 214, along with motion estimation data such as motion vectors either obtained from the encoded/compressed data or determined by the motion estimation module 210, to construct other frames or portions of video data in reference to the reference frames. In one embodiment, a motion vector is used to locate a portion of an already reconstructed reference frame that is used to construct the portion of the other frame. In one embodiment, a matching block of pixels in a first frame is identified by the motion estimation module 210 for each block in a second frame. A residual error measurement such as a sum of absolute differences (SAD) or a mean square error (MSE) may be used to identify a matching reference portion or portions that may be used to construct other video frames using the frame interpolation module 214.

The motion vector selection module 212 receives motion data from the motion estimation module 210 and selects motion vectors for use by the frame interpolation module 214 to generate interpolated frames. The output of the motion estimation and compensation module 210 may also be used to provide de-interlacing and video format conversion function. Occlusions occurring in a video sequence present a problem to motion estimation/compensation methods. Occlusions refer to: the covering of one object (background is considered as an object) by another and the uncovering of one object due to motion of another.

Generally, greater robustness in computing the motion compensated pixel values can be achieved by determining the final value as the weighted combination of several results obtained from a set of candidate motion vectors $\{v^k=(v^k_x, v^k_y)|k=1, 2, \ldots, p\}$, where $p>1$, instead of using the result obtained from just a single motion vector. Hence, the motion compensated value of a pixel at row m and column n, $I^{t-\beta}_{MCk}[m,n]$, for a given motion vector $v^k=(v^k_x,v^k_y)$ estimated from frame $I^t$ to $I^{t-1}$ is determined as indicated below in equation 1:

$$I^{t-\beta}_{MCk}[m,n]=\alpha \cdot I^t[m-(\beta \cdot v^k_y),n-(\beta \cdot v^k_x)]+\beta \cdot I^{t-1}[m+(\alpha \cdot v^k_y),n+(\alpha \cdot v^k_x)] \quad (1)$$

where $\alpha$, $\beta$ represent the interpolation phase between time instants t and t−1 satisfying $0 \leq \alpha$, $\beta \leq 1$, $\alpha+\beta=1$, and where $I^{t-1}$, $I^t$ are two adjacent frames of the video sequence.

A robust final motion compensated value can be estimated as the weighted average of the motion compensation results calculated using a set of p candidate motion vectors as shown by equation 2:

$$I^{t-\beta}_{MC}[m,n]=\Sigma_{k=1,\ldots,p}w_k \cdot I^{t-\beta}_{MCk}[m,n] \quad (2)$$

where weights $w_k$ satisfy $0 \leq w_k \leq 1$, $\Sigma_{k=1,\ldots,p}w_k=1$. Various methods exist to calculate the weights $w_k$. For example, one commonly used method is to calculate $w_k$ as a function of the difference between the interpolated values as shown by equation 3:

$$w_k=f(|I^t[m-(\beta \cdot v^k_y),n-(\beta \cdot v^k_x)]-I^{t-1}[m+(\alpha \cdot v^k_y),n+(\alpha \cdot v^k_x)]|) \quad (3)$$

The total/average difference between local neighborhoods surrounding the interpolation locations, viz. $[m-(\beta \cdot v^k_y),n-(\beta \cdot v^k_x)]$ and $[m+(\alpha \cdot v^k_y),n+(\alpha \cdot v^k_x)]$, in frames $I^t$ and $I^{t-1}$ respectively, may be used to compute $w_k$. Other embodiments may also calculate the weighting based on factors such as variance of the motion vectors comprising the candidate set as well as variance of the estimated motion vectors in a local neighborhood.

Generally, in occlusion areas, the covered/uncovered object exists in only one of the two frames $I_t$ and $I_{t-1}$, and hence, using equation (1) to compute the motion compensated pixel value can cause visual artifacts which is usually referred to as halo effect. U.S. patent application Ser. No. 11/748,377, "System and Method for Phase Adaptive Occlusion Detection Based on Motion Vector Field in Digital Video", which is hereby incorporated by reference in its entirety, provides one solution that comprises identifying covering and uncovering areas and using appropriate one-sided interpolation (from only $I_t$ or $I_{t-1}$ in these detected areas). However, further reductions in halo may be desirable.

Figure 3:
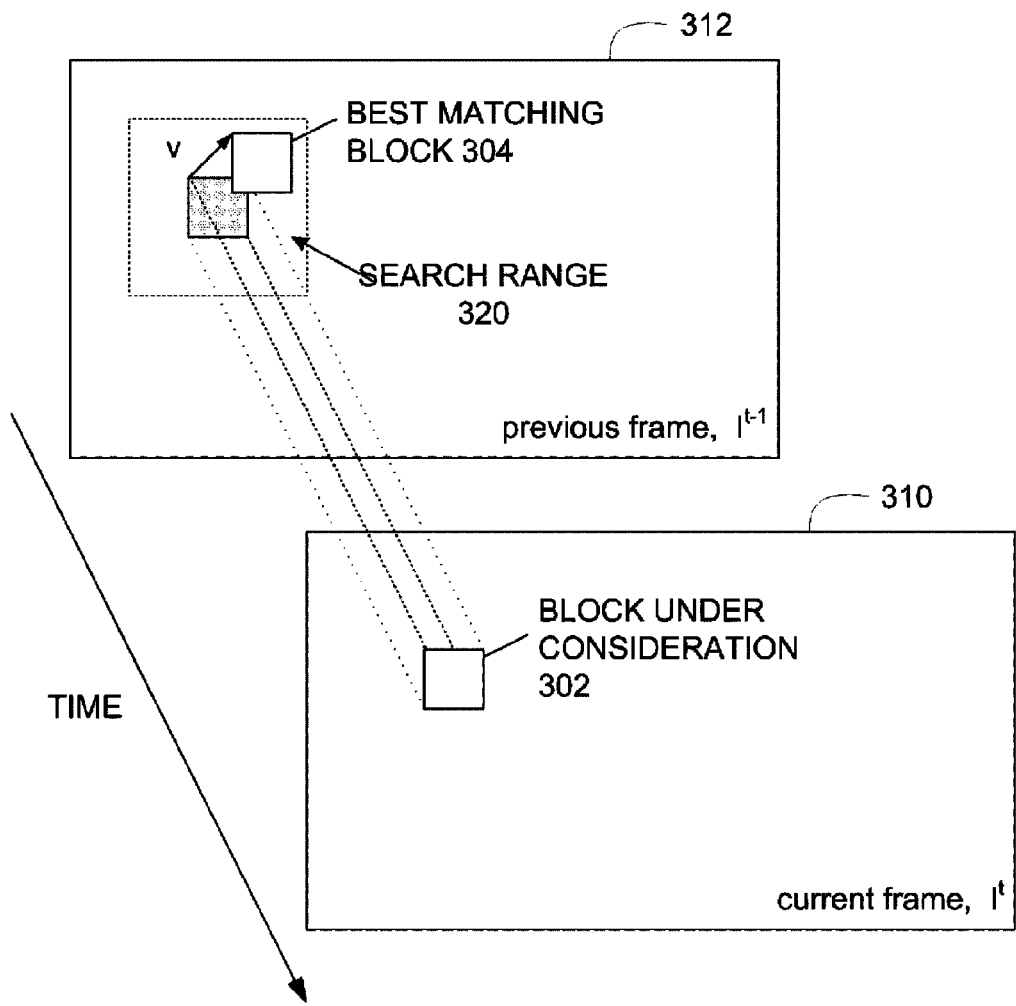
FIG. 3 is an illustration of an example of block matching used in a system such as illustrated in FIG. 2.

FIG. 3 is an illustration of an example of block matching such as performed by the motion estimation module 210. In particular, FIG. 3 illustrates backward block-matching motion estimation (identifying the best match for each block 302 in the current frame 310, $I^t$, with a block 304 from a previous frame 312, $I^{t-1}$). In particular, For each block 302 in the current video frame 310, $I^t$, (at time instant t), the best matching block 304 within a pre-defined search area 320 in the previous video frame 312, $I^{t-1}$, (at time instant 't−1' of the previous frame being matched) is determined, resulting in motion vector, v, being assigned to the block under consideration.

Figure 4:
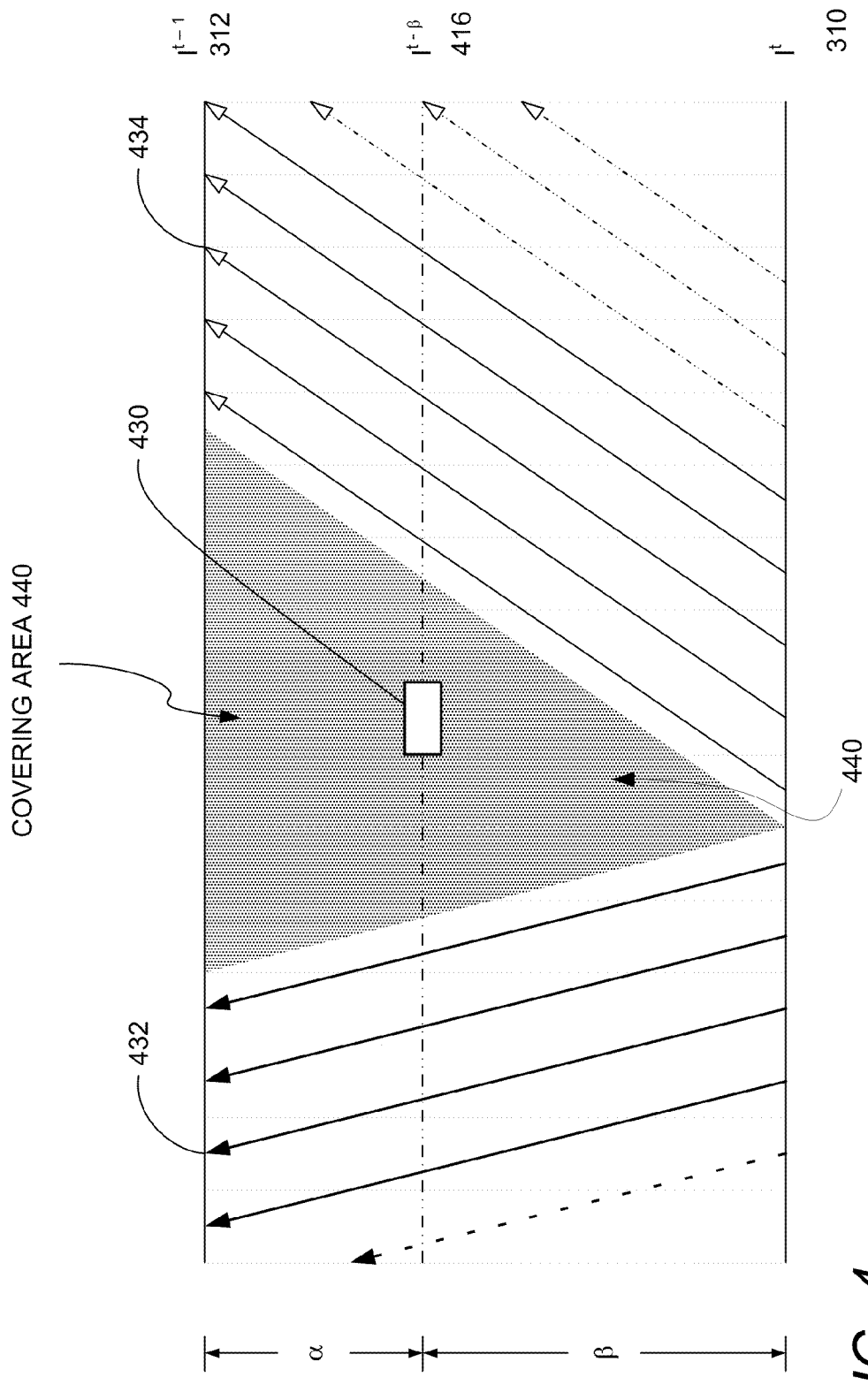
FIG. 4 is a graphic illustration of examples of covering and uncovering block identification.

FIG. 4 is an illustration of an example of occlusion and covering area to illustrate one embodiment. In particular, FIG. 4 illustrates a motion vector field between the two frames 310 and 312, at times $I^t$ and $I^{t-1}$, respectively. A frame 416, $I^{t-\beta}$ to be interpolated at time instant t−β is illustrated (where β is the time period with between frame $I^t$ 310 and the interpolated frame 416 and α is the time period between the time of prior frame $I^{t-1}$ 312 and the interpolated frame $I^{t-\beta}$ 416). In the depicted situation, two objects (the background can also be considered as an object) are interact with obj1 corresponding to motion vectors 432 (illustrated with filled end arrows) obj2 corresponding to motion vectors 434 (illustrated with unfilled end arrows). The motion vector field is representative of the case where one object is being covered by another since both obj1 and obj2 move to the same location in frame $I^t$ from different locations in frame $I^{t-1}$.

As discussed in the above-incorporated U.S. patent application Ser. No. 11/748,377, "System and Method for Phase Adaptive Occlusion Detection Based on Motion Vector Field in Digital Video", blocks such as at block 430 falling within the shaded area 440 (which represents the actual covering area) are identified as blocks subject to covering of one object by another. For example, in one embodiment, the processor 110 may classify blocks as being in a covering area by defining for each interpolated block 430 a block-scanning neighborhood based on the block width, block height and search range in horizontal and vertical directions. The parameters, block_scan_w and block_scan_h are determined as shown in the following equations (4):

$$block\_scan\_w = sr\_x/bw \quad (4.1)$$

$$block\_scan\_h = sr\_y/bh \quad (4.2)$$

where bw is the block width, bh is the block height, the search range in the horizontal direction is from −sr_x to +sr_x and the search range in the vertical direction is from −sr_y to +sr_y.

For each considered block in the video frame at interpolation phase t−β, the computed backward block MV field associated with frame $I^t$ is scanned in a local neighborhood (with width (2*block_scan_w+1) and height (2*block_scan_h+1)) which has a center that coincides with the location of the block under consideration.

Each block belonging to this local neighborhood is then projected according to its MV and the overlap area (or alternatively, an indicator of the overlap area) between the block under consideration and the projected block at interpolation phase t−β is computed. As an example, let $B^{t-\beta}(x,y)$ represent a block under consideration centered at pixel location (x,y) at interpolation phase t−β and block $K^t(p,q)$ which belongs to the scanning local neighborhood. Let the corresponding backward MV associated with block $K^t(p,q)$ in the block MV field estimated from video frames $I^t$ to $I^{t-1}$ be $(v^x, v^y)$. Therefore, the projected block location of block $K^t(p,q)$ according to its associated block motion vector $(v^x, v^y)$ is $K^{t-\beta}(r,s)$, where $(r,s)=(p+\beta \cdot v^x, q+\cdot v^y)$. The overlap area between blocks $B^{t-\beta}(x,y)$ and $K^{t-\beta}(r,s)$ is then calculated.

The exact overlap area need not be necessarily computed—any indicator of overlap area can alternatively be used. Some examples of overlap area indicator can be the inverse proportional value to either the Euclidean distance $\sqrt{(x-r)^2+(y-s)^2}$ or City-Block distance |x−r|+|y−s| between the centers of the two blocks.

The blocks belonging to the local neighborhood are then ranked in descending order depending on the score as per the overlap area metric (note that blocks without any overlap, have an overlap area of zero). For robustness, metrics of blocks with an overlap area less than a certain pre-determined threshold, T, can be set to zero. The block under consideration is then classified into one of three pass-through status categories, viz. NORMAL, COVERING, UNCOVERING, as per criteria illustrated in Table 1 (for backward block matching) or Table 2 (for an another embodiment that uses forward block matching):

TABLE 1

| Classification | Criteria |
| --- | --- |
| NORMAL | 1) if there exists only one block in the local neighborhood with a non-zero overlap area OR<br>2) if the center of blocks with the best two overlap area measures in the local neighborhood are separated by a distance less than or equal to another pre-determined threshold, D = (dx, dy) |
| COVERING (using backward block matching) | if none of the blocks in the local neighborhood have a non-zero overlap area |
| UNCOVERING (using backward block matching) | if the center of blocks with the best two overlap area measures are separated by a distance greater than the pre-determined threshold, D = (dx, dy) |

TABLE 2

| Classification | Criteria |
| --- | --- |
| NORMAL | 1) if there exists only one block in the local neighborhood with a non-zero overlap area OR<br>2) if the center of blocks with the best two overlap area measures in the local neighborhood are separated by a distance less than or equal to another pre-determined threshold, D = (dx, dy) |
| COVERING (using forward block matching) | if the center of blocks with the best two overlap area measures (adjacent blocks can be ignored) are separated by a distance greater than the pre-determined threshold, D = (dx, dy) |
| UNCOVERING (using forward block matching) | if none of the blocks in the local neighborhood have a non-zero overlap area |

Based on such classification of covering and uncovering blocks to identify a covering area 440, the motion compensation for pixels in these blocks can be biased towards using data from frame $I^{t-1}$. Mathematically, $$I^{t-\beta}_{MCk}[m,n] = \alpha_{adj} \cdot I^t[m-(\beta \cdot v^k_y), n-(\beta \cdot v^k_x)] + \beta_{adj} \cdot I^{t-1}[m+(\alpha \cdot v^k_y), n+(\alpha \cdot v^k_x)] \quad (5)$$

where $0 \leq \alpha_{adj} \leq \alpha$, $\alpha_{adj}+\alpha_{adj}=1$. In other word, the motion compensated result of the considered block 440, which is classified as COVERING block based on backward MV field, using the modified equation (5) yields a more accurate result since the data for the covered object is present only in the previous frame, $I^{t-1}$. However, with the given information, it is impossible to tell which object is getting covered—that is, it is not possible to tell if obj1 is getting covered by obj2 or if obj2 is getting covered by obj1. In other words, the depth order of the objects (obj1 and obj2) cannot be determined with information derived from one motion vector field. In motion compensation systems of the type represented in equation (2), for example, for blocks such as the block 430 the weights $w_k$, corresponding to different motion vectors $v^k$, cannot be accurately determined based on differences in pixel values due to the fact that the covered part of one of the objects is present only in frame $I^{t-1}$ and hence has no correspondence in frame $I^t$. Such systems therefore generate an output frame $I^{t-\beta}$ that can have visual artifacts in the form of a halo around boundaries of objects with different motion. Even for motion compensation systems that employ only one motion vector for computing the final motion compensated value for pixels belonging to blocks exemplified by the block 430, it is impossible to distinguish between the motion vectors 432 and 434 for purposes of accurate motion compensation. This is because the depth order of obj1 and obj2 is unknown.

One embodiment provides a system and method to achieve more accurate motion compensation in covering areas such as the one depicted in FIG. 4 is by computing the weights $w_k$ based on additional information in the form of the previous motion vector field between frames $I^{t-1}$ and an additional frame $I^{t-2}$. Desirably, a consequence of the higher accuracy in motion compensation in such areas can be significantly less perceived halo in the output video. For motion compensation systems that employ a single motion vector, another embodiment includes making a decision as to which motion vector to use (from the set of candidate motion vectors) based on the motion data between frames $I^{t-1}$ and the additional frame $I^{t-2}$ in order to achieve more accurate motion compensation.

Figure 5:
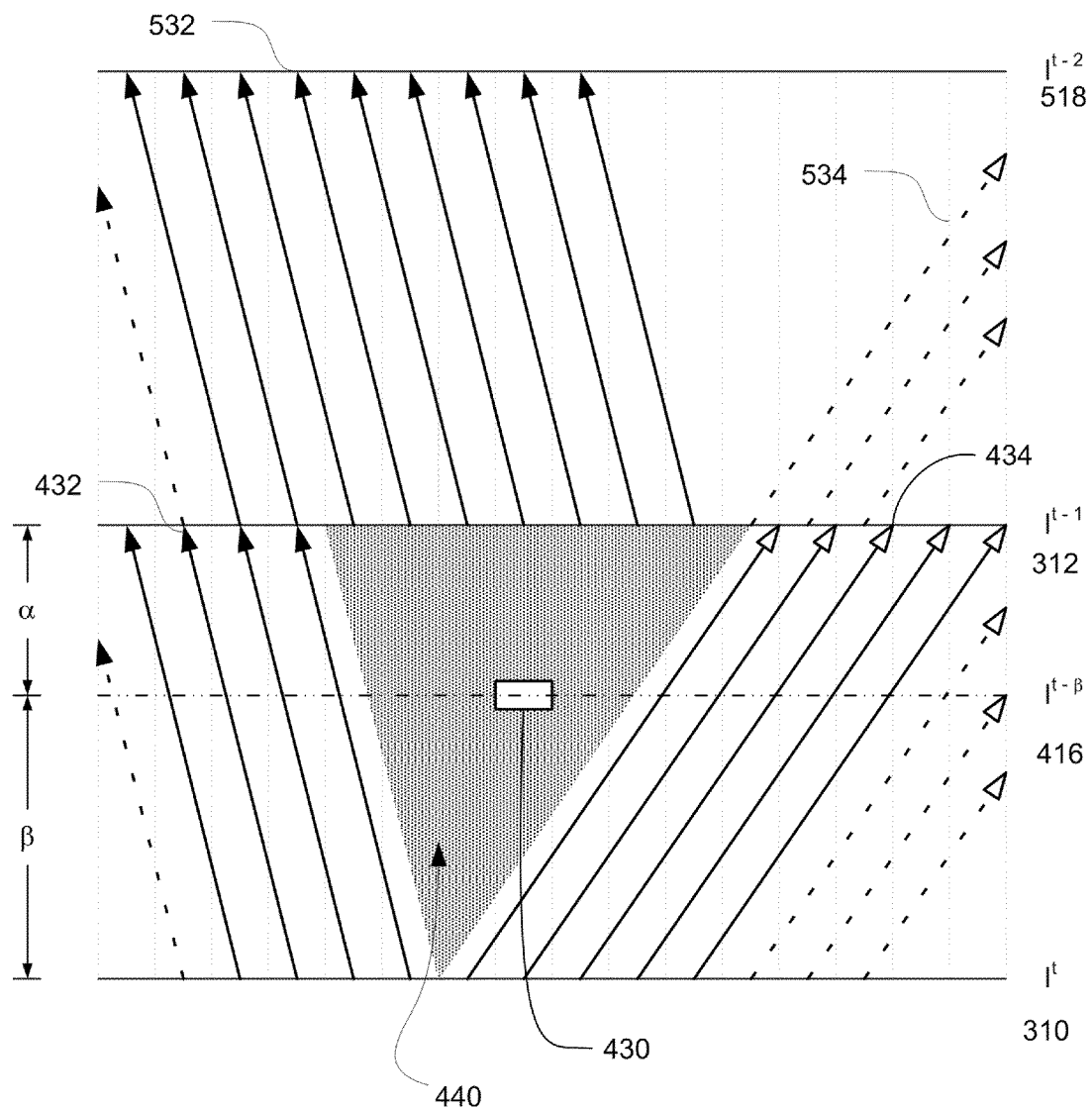
FIG. 5 is a graphic illustration of another example of covering and uncovering block identification that may be used according to one embodiment.

FIG. 5 is a graphic illustration of another example of covering and uncovering block identification that extends the example of FIG. 4 to include availability of additional information in the form of the motion vector field between the frame 312, $I^{t-1}$ and another frame 518, $I^{t-2}$. As illustrated, analysis of the motion vector fields 532 and 534 can better establish the depth order of obj1 and obj2. For example, it is evident from FIG. 5 that in the covering area 440 (shown in shading) between frames $I^t$ and $I^{t-1}$, obj1 (based on its corresponding motion vector fields 432 and 532) is being covered by obj2 (based on its corresponding motion vector fields 434 and 534). Consequently, it is to be recognized that the motion vectors 532 and 534 are useful for obtaining the motion compensated pixel values for blocks such as the block 430, e.g., blocks which are classified as belonging to a covering area. This distinction in the use of the two candidate motion vectors 523 and 534 in combination with interpolation biased to use data from frame $I^{t-1}$ can provide significantly more accurate motion compensation and yield a more pleasing visual output with reduced artifacts.

Figure 6:
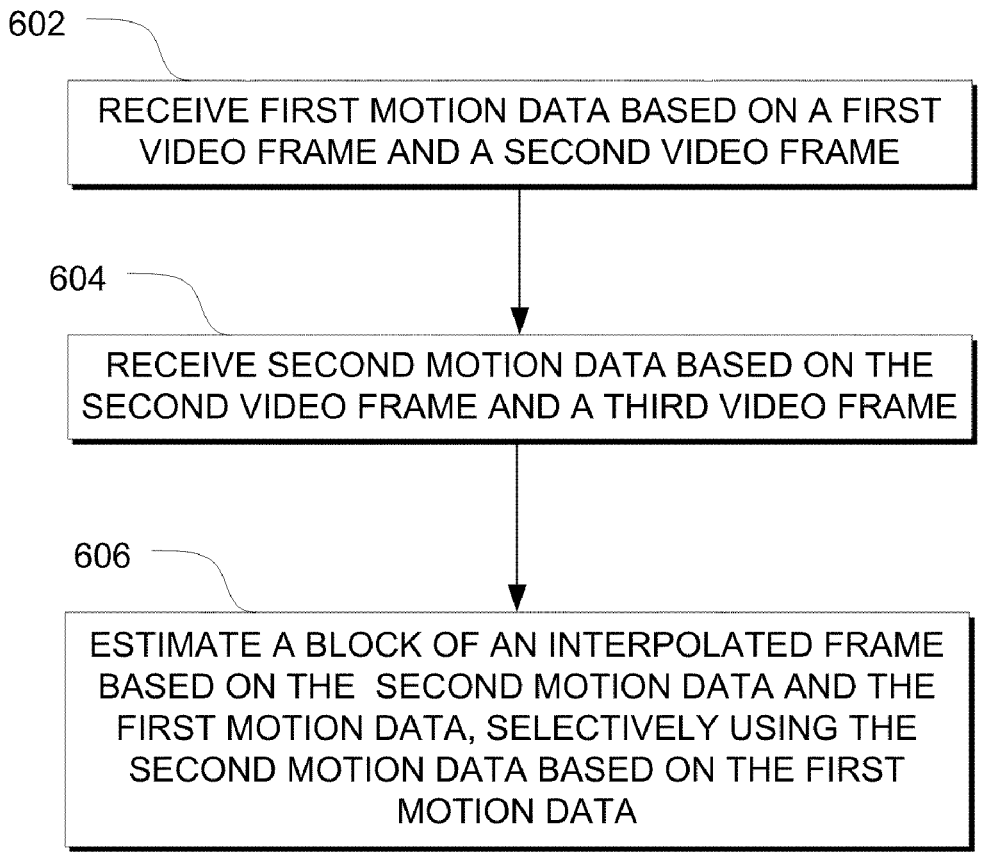
FIG. 6 is a flowchart illustrating one embodiment of a method of estimating blocks in an interpolated frame in a system such as illustrated in FIG. 1.

FIG. 6 is a flowchart illustrating one embodiment of a method 600 of estimating blocks in an interpolated frame in the system 100 using additional motion data to better identify covering and uncovering blocks as discussed above and illustrated with respect to FIG. 5. The method begins at a block 602 in which the processor 110 receives first motion data, based on a first video frame and a second video frame, e.g., the frame 518, $I^{t-2}$ and the frame 312, $I^{t-1}$. This motion data may include the vectors 532 and 534 of FIG. 5. In one embodiment, the processor 110 receives the motion data from a memory (See FIG. 9).

Next at a block method begins at a block 602 in which the processor 110 receives first motion data, based on a first video frame and a second video frame, e.g., the frame 312, $I^{t-1}$ and the frame 310, $I^t$. This motion data may include the vectors 532 and 534 of FIG. 5. In one embodiment, the processor 110 receives the motion data from a memory (See FIG. 9).

In one embodiment, in which backward motion data is used, the second frame is subsequent to the first frame and the third frame is subsequent to the second frame. It is to be recognized that in another embodiment, forward motion estimation data may be used. In such a case, the first frame is subsequent to the second frame and wherein the second frame is subsequent to the third frame.

Moving to a block 604, the processor 110 estimates a block of an interpolated frame, e.g., the block 404, based on the second motion data, e.g., motion vectors 432 and 434 and the first motion data, e.g., motion vectors 532 and 534, selectively using the second motion data based on the first motion data.

Figure 7:
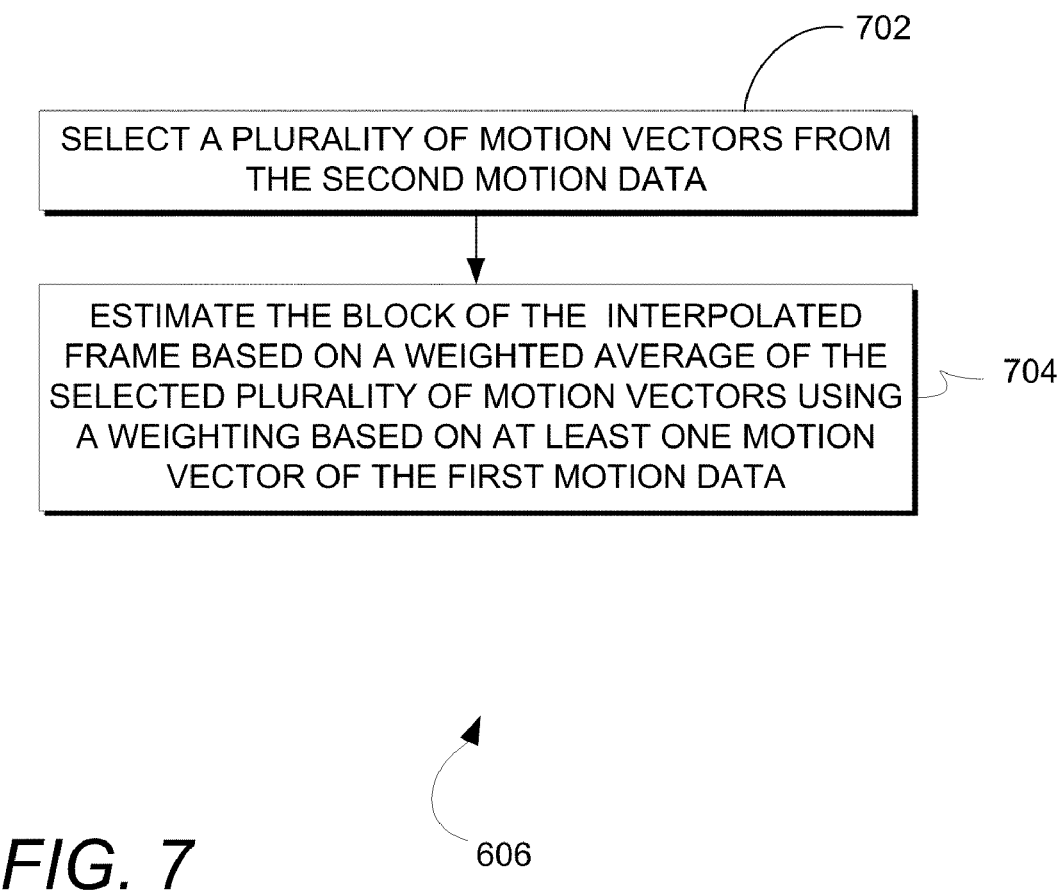
FIG. 7 is a flowchart illustrating further details of one embodiment of the method illustrated in FIG. 6.

FIG. 7 is a flowchart illustrating further details of one embodiment of the method 600. In particular, FIG. 7 illustrates one embodiment of a subprocess associated with the block 606 of FIG. 6. The subprocess of the block 606 begins at a block 702 in which a plurality of motion vectors, e.g., one or more of the vectors 432 and 434, is selected from the second motion data (e.g., the motion field between the frame 312, $I^{t-1}$, and the frame 310, $I^t$, illustrated in FIG. 4) to define a set of candidate motion vectors.

Candidate motion vectors can be selected using any suitable method, including those known in the art. For example, the set of candidate motion vectors may be selected according to methods disclosed in U.S. patent application Ser. No. 11/846,464, entitled "System and Method for Motion Vector Collection for Motion Compensated Interpolation of Digital Video," which is hereby incorporated by reference in its entirety. Hence, for example, in one embodiment, motion vectors are selected based on a projection of blocks associated with the motion vectors into the interpolated frame 416. One or more of the motion vectors having the greatest overlap between these projected blocks and the block 430 to be interpolated are selected for the candidate set. In addition, one or more immediate neighboring motion vectors of the selected motion vectors may also added to the candidate set of motion vectors.

Moving to a block 704, the processor 110 estimates the block 404 of the interpolated frame based on a weighted average of the selected plurality of motion vectors of the set of candidate motion vectors, where the weighted average is weighted based on at least one motion vector of the first motion data. In one embodiment, the interpolation is performed based on equation (2) above with a weighting, $w_k$, that is based on at least one motion vector of the first motion data, e.g., motion vectors 532 and 534 (e.g., the motion field between the frame 312, $I^{t-1}$, and the frame 518, $I^{t-2}$, illustrated in FIG. 4). In one embodiment, the calculation of weights $w_k$ is a function of the difference between the interpolated values. In other embodiments, the calculation of the weights $w_k$ is a function of one or both of the total or average difference between local neighborhoods of blocks surrounding the interpolation locations. In one embodiment, weights $w_k$ is also a function of the difference between the motion vector $v_k$ and a motion vector of the first motion field, e.g., a reference motion vector, $v_{ref}$, which is calculated based on the pixel location [m,n] in the first motion data. In one embodiment, the weights $w_k$ are further a function of a value ω that serves as indicator of the confidence in the occlusion area identification. A weighting function according to one embodiment can generally be represented by equation 6:

$$w_k = f(|I^t[m-(\beta \cdot v^k_y), n-(\beta \cdot v^k_x)] - I^{t-1}[m+(\alpha \cdot v^k_y), n+(\alpha \cdot v^k_x)]|, |v_k - v_{ref}|, \omega) \quad (6)$$

An example of a method according to one embodiment of computing ω is given below in equation 7:

$$\omega = |\alpha - \alpha_{adj}|/\alpha \quad (7)$$

A specific example equation according to one embodiment to compute the value of $w_k$ is shown in equation 8.

$$w_k = \omega \cdot \exp(-|I^t[m-(\beta \cdot v^k_y), n-(\beta \cdot v^k_x)] - I^{t-1}[m+(\alpha \cdot v^k_y), n+(\alpha \cdot v^k_x)]|) + (1-\omega) \cdot \exp(-|v_k - v_{ref}|) \quad (8)$$

Figure 8:
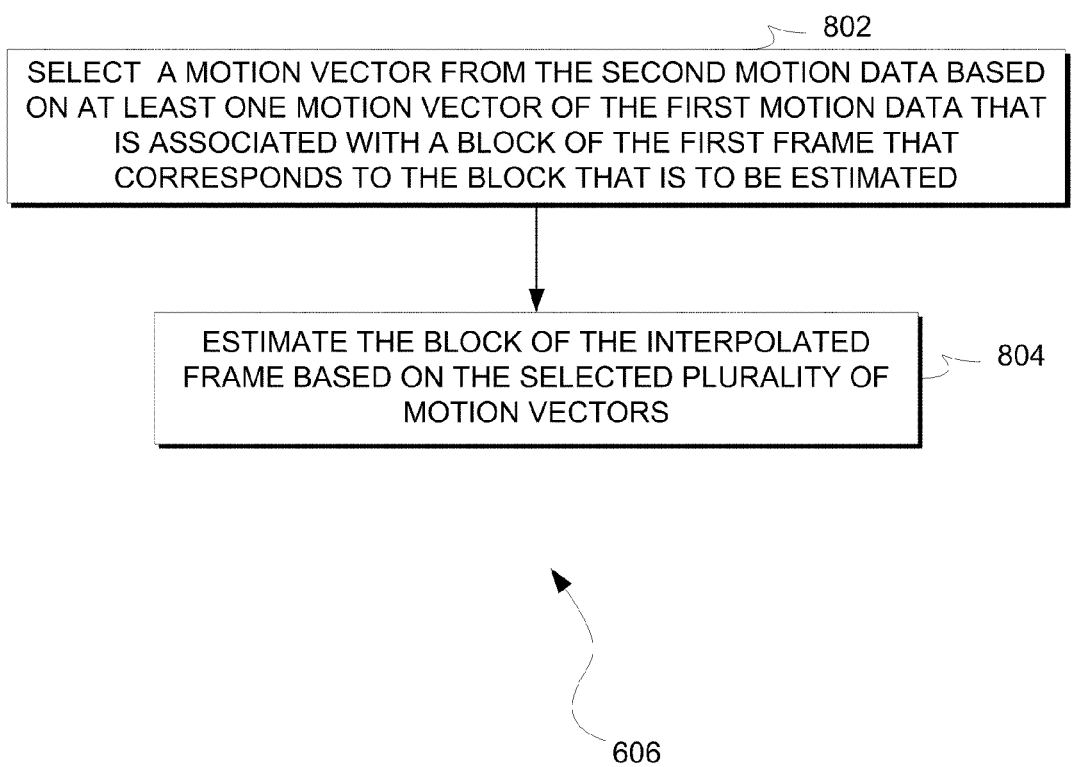
FIG. 8 is a flowchart illustrating further details of another embodiment of the method illustrated in FIG. 6.

FIG. 8 is a flowchart illustrating further details of another embodiment of the method 600. In particular, FIG. 8 illustrates another embodiment of a subprocess associated with the block 606 of FIG. 6. The embodiment of the subprocess of the block 606 begins at a block 702 in which select a motion vector from the second motion data, e.g., one or more of the vectors 432 and 434, is selected from the second motion data (e.g., the motion field between the frame 312, $I^{t-1}$, and the frame 310, $I^t$, illustrated in FIG. 4) based on at least one motion vector selected from the first motion data, e.g., at least one of motion vectors 532 and 534 (e.g., the motion field between the frame 312, $I^{t-1}$, and the frame 518, $I^{t-2}$, illustrated in FIG. 4). In one embodiment, this may include merely selecting the motion vector that would have the greatest weighting according to equation (6) or equation (8). Conceptually, the motion vector, e.g., one of vectors 432 and 434, is selection from the second motion data by using at least one of the motion vectors 532 and 534 to make a decision as to the depth order of obj1 and obj2.

It is to be recognized that while one embodiment is described with respect to backward motion estimation, other embodiments include use forward motion estimation. In other embodiments, forward and backward motion estimation data can be selectively used based on a specified criterion such as comparing the results of using forward and backward data and selecting according to, for example, image noise criteria. For example, instead of using a frame subsequent to an interpolated frame along with two frames prior to the time of the interpolated frame, in one embodiment, data from two frames subsequent to the interpolated frame can be used instead.

Figure 9:
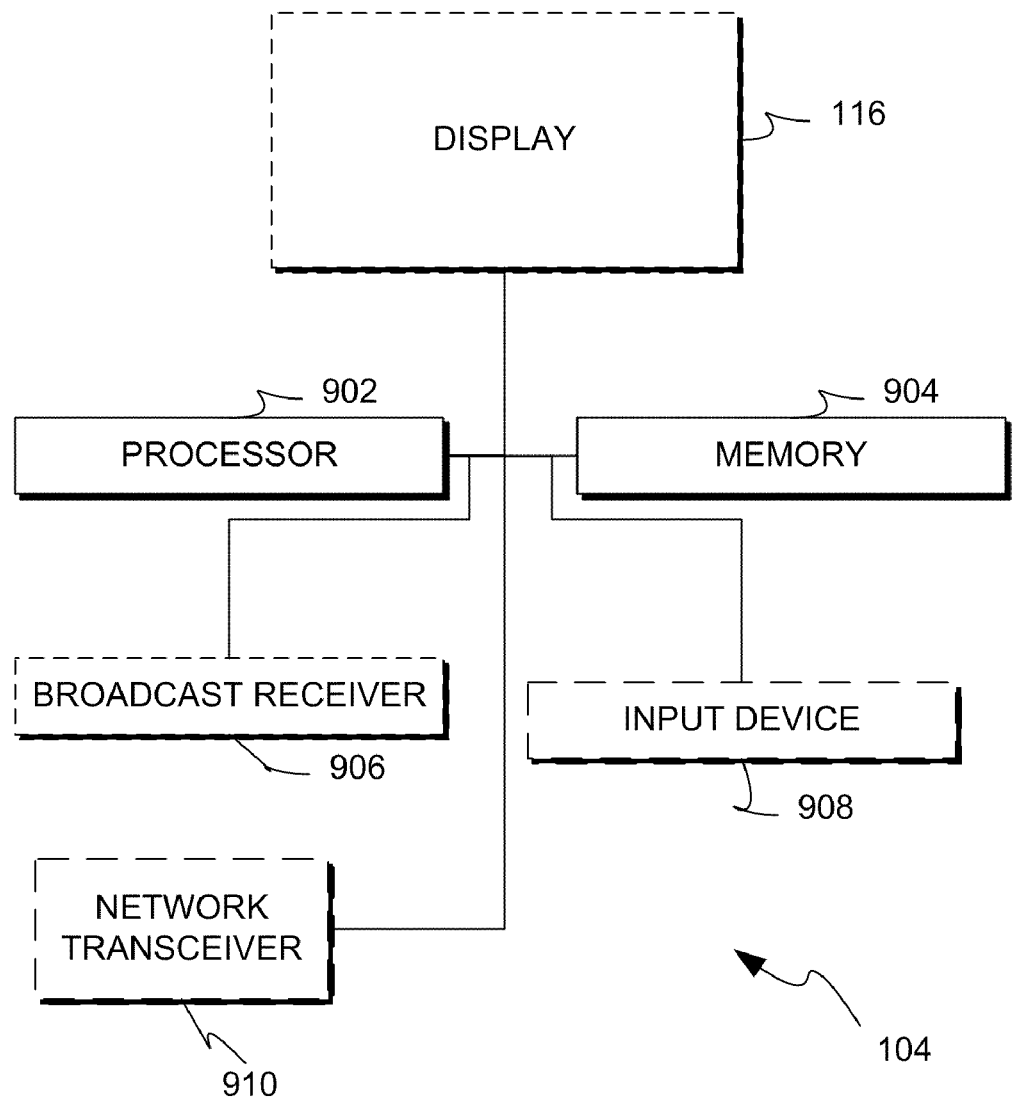
FIG. 9 is a functional block diagram illustrating one embodiment of a video receiver such as illustrated in FIG. 1.

FIG. 9 is a block diagram illustrating components of one embodiment of a video receiver 104 of the system 100. The receiver 104 may optionally include the display device 116 (e.g., when embodied in a television). A processor 902 may communicate with the display 116 and a memory 904. The video receiver 104 may further optionally comprise components such as a broadcast receiver 906, an input device 908 such as a front panel control or a remote control, and optionally with a network transceiver 910 for receiving video signal via a data network such as home network or the Internet. The processor 902 may be configured to perform the various functions associated with the video receiver 104. In one embodiment, the memory 904 includes an instruction storage medium having instructions (or data indicative of such instructions where the instructions are stored in compressed or encrypted form) that causes the processor 902 to the perform functions associated with the device 104. The memory 904 may further be configured to store the first and second motion data as described above with reference to FIG. 6. In addition, or instead of the control device 908, the video receiver 104 may implement any other suitable input mechanism including those discussed above with reference to identifying a viewer. The network transceiver 910 may comprise any suitable network interface such as wired or wireless Ethernet and be configured to communicate with a video source or be configured to implement any other application.

Accordingly, embodiments provide systems and method of detecting covering and uncovering in interpolated images. Desirably, such covering and uncovering detection can use forward and backward motion estimation so as to provide interpolated images that include reduced halo and other such artifacts.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those skilled in the art will recognize that the various illustrative logical blocks, modules, circuits, and algorithm steps described in connection with the aspects disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure.

For example, any illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A method of video frame interpolation, comprising:
   receiving first motion data based on a first video frame and a second video frame;
   receiving second motion data based on the second video frame and a third video frame;
   estimating a block of an interpolated frame based on the second motion data and the first motion data with the interpolated frame between the second video frame and the third video frame;
   selecting a motion vector of the first motion data associated with a portion of the first video frame corresponding to the block to be estimated;
   calculating a specified confidence value based on a time associated with the interpolated frame and a time associated with the third video frame; and
   wherein:
   estimating the block comprises selectively using the second motion data based on the first motion and selecting motion vectors from the second motion data, and estimating the block based on a weighted average of the motion vectors, and the weighted average is weighted:
   based on at least one motion vector of the first motion data,
   based at least in part on a difference between each of the motion vectors and the motion vector of the first motion data, and
   based at least in part on the specified confidence value; and
   calculating the specified confidence value includes calculating the specified confidence value based at least in part on $(\alpha-\alpha_{adj})/\alpha$, wherein $\alpha$ is the time associated with the third video frame and wherein $\alpha_{adj}$ is the time associated with the interpolated frame.

2. The method of claim 1, wherein:
   receiving the first motion data includes receiving the second video frame subsequent to the first video frame; and
   receiving the second motion data includes receiving the third video frame subsequent to the second video frame whereby the first motion data comprises backward motion estimation data.

3. The method of claim 1, wherein:
   receiving the first motion data includes receiving the first video frame subsequent to the second video frame; and
   receiving the second motion data includes receiving the second video frame subsequent to the third video frame whereby the first motion data comprises forward motion estimation data.

4. The method of claim 1, wherein estimating the block comprises estimating the block based on the weighted average calculated at least in part as a function of a difference between interpolated values of the block based on the second and third motion data.

5. The method of claim 1, wherein selectively using the second motion data based on the first motion data comprises identifying the block of the interpolated frame as being in one of a covering or uncovering area based at least in part on the first motion data.

6. The method of claim 1, wherein:
   selectively using the second motion data based on the first motion data comprises selecting one of the motion vectors from the second motion data based at least in part on the motion vector of the first motion data; and
   estimating the block comprises estimating the block based on one of the motion vectors of the second motion data.

7. A system for video frame interpolation, comprising:
   a memory configured to store first motion data based on a first video frame and a second video frame and second motion data based on the second video frame and a third video frame; and
   at least one processor configured to:
   estimate a block of an interpolated frame based on selective use of the second motion data based on the first motion data and the interpolated frame is between the second video frame and the third video frame,
   select a motion vector of the first motion data associated with a portion of the first video frame corresponding to the block to be estimated,
   select motion vectors from the second motion data, and
   estimate the block based on a weighted average of the motion vectors, and the weighted average is weighted:
   based on at least one motion vector of the first motion data,
   based at least in part on a difference between each of the selected motion vectors and the motion vector of the first motion data, and
   based at least in part on a specified confidence value,
   calculate the specified confidence value based on a time associated with the interpolated frame and a time associated with the third video frame, and
   calculate the specified confidence value based at least in part on $(\alpha-\alpha_{adj})/\alpha$, wherein a is the time associated with the third video frame and wherein $\alpha_{adj}$ is the time associated with the interpolated frame.

8. The system of claim 7, wherein:
   the second video frame is subsequent to the first video frame; and
   the third video frame is subsequent to the second video frame whereby the first motion data comprises backward motion estimation data.

9. The system of claim 7, wherein:
   the first video frame is subsequent to the second video frame; and
   the second video frame is subsequent to the third video frame whereby the first motion data comprises forward motion estimation data.

10. The system of claim 7, wherein the weighted average is calculated at least in part as a function of a difference between interpolated values of the block based on the second and third motion data.

11. The system of claim 7, wherein the processor is further configured to selectively use the second motion data based on the first motion data by identifying the block of the interpolated frame as being in one of a covering or uncovering area based at least in part on the first motion data.

12. The system of claim 7, wherein:
   the processor is configured to selectively use the second motion data based on the first motion data by selecting one of the motion vectors from the second motion data based at least in part on the motion vector of the first motion data; and
   the processor is configured to estimate the block based on one of the motion vectors of the second motion data.

13. The system of claim 7, further comprising at least a television, a set-top box, a digital-video recorder, or a recorded media player.

* * * * *